United States Patent [19]

Faulkner, III et al.

[11] Patent Number: 5,024,709

[45] Date of Patent: Jun. 18, 1991

[54] CONTACT-FREE METHOD OF FORMING SIFT-PROOF SEALS

[75] Inventors: W. Harrison Faulkner, III; Douglas E. Colton, both of Salinas, Calif.

[73] Assignee: Slautterback Corporation, Monterey, Calif.

[21] Appl. No.: 468,368

[22] Filed: Jan. 22, 1990

[51] Int. Cl.[5] .............................................. B32B 31/06

[52] U.S. Cl. ................................ 156/69; 156/244.11; 156/295; 118/315; 118/411; 427/286; 493/85; 493/128; 493/131; 493/151

[58] Field of Search ..................... 156/69, 244.11, 295; 118/313, 315, 324, 410, 411; 427/208.2, 286, 424; 493/85, 114, 121, 128, 129, 130, 131, 134, 135, 151, 212, 264

[56] References Cited

U.S. PATENT DOCUMENTS

| | | | |
|---|---|---|---|
| 1,258,294 | 3/1918 | Carlson | 493/128 |
| 4,115,178 | 9/1978 | Cone | 156/295 |
| 4,157,149 | 6/1979 | Moen | 118/411 |
| 4,550,681 | 11/1985 | Zimmer et al. | 118/410 |
| 4,679,711 | 7/1987 | Trevathan | 222/330 |
| 4,687,137 | 8/1987 | Boger et al. | 118/315 |
| 4,735,169 | 4/1988 | Cawston et al. | 118/411 |
| 4,774,109 | 9/1988 | Hadzimihalis et al. | 427/286 |
| 4,836,440 | 6/1989 | French | 229/132 |

FOREIGN PATENT DOCUMENTS

| | | | |
|---|---|---|---|
| 1263750 | 11/1987 | Japan | 156/295 |

*Primary Examiner*—Caleb Weston

*Attorney, Agent, or Firm*—Schneck & McHugh

[57] ABSTRACT

A method of forming a sift-proof seal for closure of a box having a plurality of folded flaps, the seal being formed by an adhesive strip pattern. The flaps are moved linearly toward a plurality of nozzles which extrude adhesive in a pattern of closely spaced adhesive strips. A flap having such an adhesive pattern is brought into contact with a second flap to compress the pattern of adhesive therebetween. The spacing between adjacent strips of adhesive is such that the folding of the flap causes merging of the adhesive to form a continuous strip of adhesive, thereby forming a box closure. The adhesive pattern is limited to a first outside edge of the first flap, with each remaining outside edges receiving a sift-proof continuous line of adhesive.

19 Claims, 2 Drawing Sheets

CONTACT-FREE METHOD OF FORMING SIFT-PROOF SEALS

DESCRIPTION

1. Technical Field

The present invention relates to methods of applying adhesive to a container to form a seal which precludes sifting of contents from the container.

2. Background Art

In the packaging of detergents and food products which are granulated or pulverized, prevention of sifting of the contents of a container is an important concern. Typically, in the packaging of food products such as cereals, waxed glassine paper or high-density polyethylene is used to form a product-containing liner for insertion into a cardboard carton. The trend, however, has been toward linerless containers since they reduce the amount of packaging materials and permit increased assembly line speeds.

Sealing of flaps of a cardboard carton or other container, therefore, has received increasing attention in the packaging art. One method of forming sift-proof seals is to utilize an application wheel which contacts one or more flaps of the cardboard carton, leaving adhesive in a pattern dictated by construction of the wheel. The flaps of the carton are then folded toward the center of the carton and brought into contact with one another to form a sift-proof seal. The contact wheel system, however, is susceptible to contamination, stringing of hot-melt material, and excessive use of hot-melt material. Granulated laundry detergent is particularly likely to cause contamination and plugging, but the cardboard itself will also lead to contamination problems.

U.S. Pat. No. 4,735,169 to Cawston et al. is directed to forming sift-proof seals. Cawston et al. teaches an applicator assembly for applying hot-melt adhesive to an end flap of a carton using nozzles and elongated wear-resistant doctor blades. Plates which comprise the doctor blades are separated by a shim to define a fluid-discharge slot into which the adhesive flows. The lowermost ends of the doctor blades are formed in various configurations to spread the adhesive in the desired pattern or thickness on the end flaps. It is recognized in the Cawston et al. patent that in addition to the contamination and plugging problems described above, contact applicators are susceptible to wear. The patent teaches use of hardened steel doctor blades that are more resistant to wear than prior art doctor blades, which were made of soft material such as cast aluminum. The patent also teaches a structure which provides for replacement of worn dispensing nozzles with minimum cost and effort.

U.S. Pat. No. 4,836,440 to French, assigned to the same assignee as is Cawston et al., teaches away from use of non-foamed hot-melt material to achieve a sift-proof seal. According to French, one problem with hot-melt adhesives involves compressing the adhesive after application so as to obtain sufficient surface contact between the adhesive and the adhered substrate to achieve a good bond. It is thought that because of the relatively high viscosity, high surface tension, and quick setting time of such adhesives, the adhesives are prevented from spreading over a large surface area and instead set as thick beads. Therefore, French teaches use of foamed adhesive material to achieve a sift-proof seal having a desired bond strength.

Like the prior art applicators which utilize doctor blades, the foamed method of French teaches employing a plurality of applicator heads which are moved relative to a carton traveling along an assembly line. At least one of the heads is caused to travel in a direction perpendicular to carton travel so that a C-shaped application of adhesive is formed about the entirety of the outside of a flap. Movement of a head relative to an assembly line involves potential maintenance time, and therefore it is preferred that the applicator heads all remain stationary.

It is an object of the present invention to provide a method for achieving a sift-proof seals which utilizes a relatively small quantity of hot-melt adhesive and which permits applicator heads to remain stationary during the sealing process.

SUMMARY OF THE INVENTION

The above object has been met by a method of applying adhesive to flaps in a pattern which causes the flaps themselves to form the sift-proof seal. Adhesive is extruded from a plurality of closely spaced nozzles onto a flap of a container, such as a cardboard carton or paper package for sugar, flour and the like. Spacing of adjacent lines is sufficiently close to permit merging of adjacent lines in a later step. Preferably, hot-melt adhesive is applied only to a leading or trailing edge of a flap, as defined by the direction of container travel along an assembly line.

Extrusion of the adhesive provides a pattern of a relatively large number of closely spaced parallel lines of adhesive along an edge of the flap. The area of the edge of the flap which is covered by the adhesive is greater than the area of gaps between the lines of adhesive. However, because only the edge receives adhesive, a small percentage of the flap is covered. If left to solidify in such a pattern, a sift-proof container would not be achieved. However, by the folding of flaps toward the center of the container, the lines of adhesive are compressed between a first flap and a second flap. The lines of adhesive are spaced such that the compressing causes merging of adjacent lines of adhesive to provide a continuous strip of adhesive across the flaps. In this manner, the contents of the container are prevented from leaking from a first edge of the container. Continuous lines are applied along the opposed flap edges which are perpendicular to the first edge, thereby providing a sift-proof seal with a minimal amount of adhesive material.

An advantage of the present invention is that the method does not require application of high volume beads of adhesive to form a barrier across the edge of a flap. Instead, a plurality of low-volume closely spaced, continuous lines of adhesive are applied and are more easily compressed. A characteristic of the prior art high-volume applications is the inability to spread the adhesive to the desired degree, so that solidification takes place in bead form. The solidified beads limit the area of adhesive-to-flap contact per volume of adhesive used. Since the adhesive-to-flap contact determines the bond strength, solidification of the beads results in a waste of material. Thus, the present invention reduces adhesive waste.

Another advantage is that the adhesive heads are stationary, rather than being mounted to move transverse to the direction of container travel along an assembly line. Stationary heads reduce maintenance and increase reliability. Another advantage is that adhesive can be extruded at low pressure, again increasing reliability.

Yet another advantage is that adhesive is applied in a contact-free manner. Spacing apart the container from the outlet nozzles significantly lessens the risk of nozzle plugging and contamination due to contact with the container and/or contents of the container. Moreover, the contact-free application reduces equipment wear.

BEST MODE FOR CARRYING OUT THE INVENTION

Figure 1:
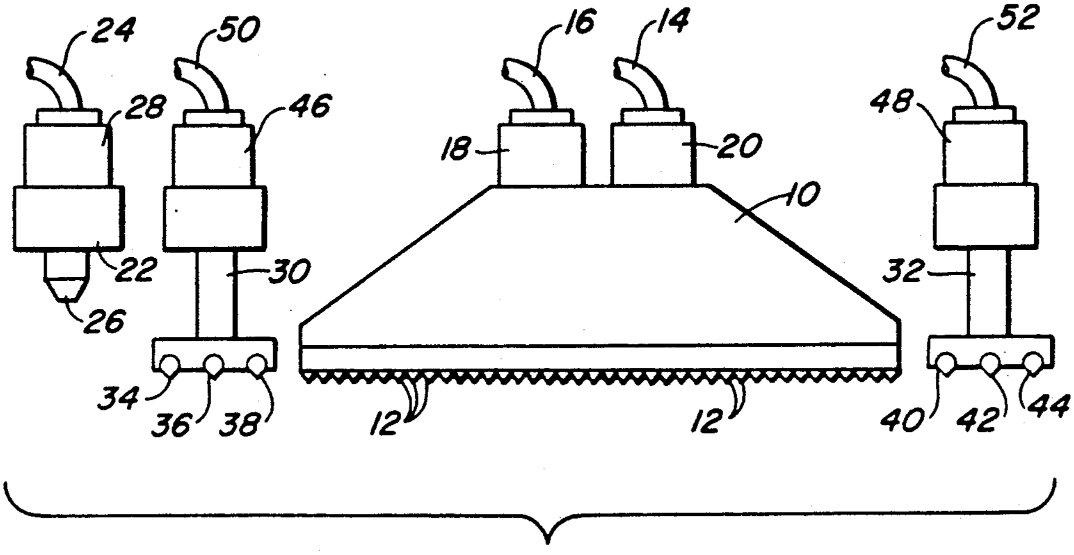
FIG. 1 is a front view of an applicator head configuration for applying adhesive to a container in accord with the present invention.

With reference to FIG. 1, a fine-line applicator head 10 is shown as having multiple nozzles 12 equidistantly spaced from each other. Hot-melt adhesive is channeled to the fine-line applicator head through a pair of hoses 14 and 16. Solenoids 18 and 20 are selectively activated to control fluid flow from the hoses to the nozzles.

The applicator head configuration also includes a single-nozzle head 22 which receives adhesive from a hose 24. A nozzle 26 is selectively placed in fluid communication with the hose 24 by actuation of a solenoid 28.

At each side of the fine-line applicator head 10 is a T-bar applicator head 30 and 32. The T-bar head 30 nearest the single-nozzle head 22 has three nozzles 34, 36 and 38. The T-bar head is identical in structure, having nozzles 40, 42 and 44. Solenoids 46 and 48 are controlled to permit fluid flow to the nozzles via hoses 50 and 52, respectively.

The nozzles 12 of the fine-line applicator head 10 are press fit into orifices of the applicator head. Preferably, adjacent nozzles 12 are spaced apart by a distance of 0.125 inch. It has been discovered that best results are achieved if the nozzles are spaced apart by a distance within the range of 0.0625 inch and 0.25 inch and the nozzles have an outlet which is 0.02 inch in diameter. The applicator head 10 is operated at low pressure, operating within the range of 200 psi and 500 psi. The preferred operating pressure for extruding the hot-melt adhesive is 300 psi.

Figure 2:
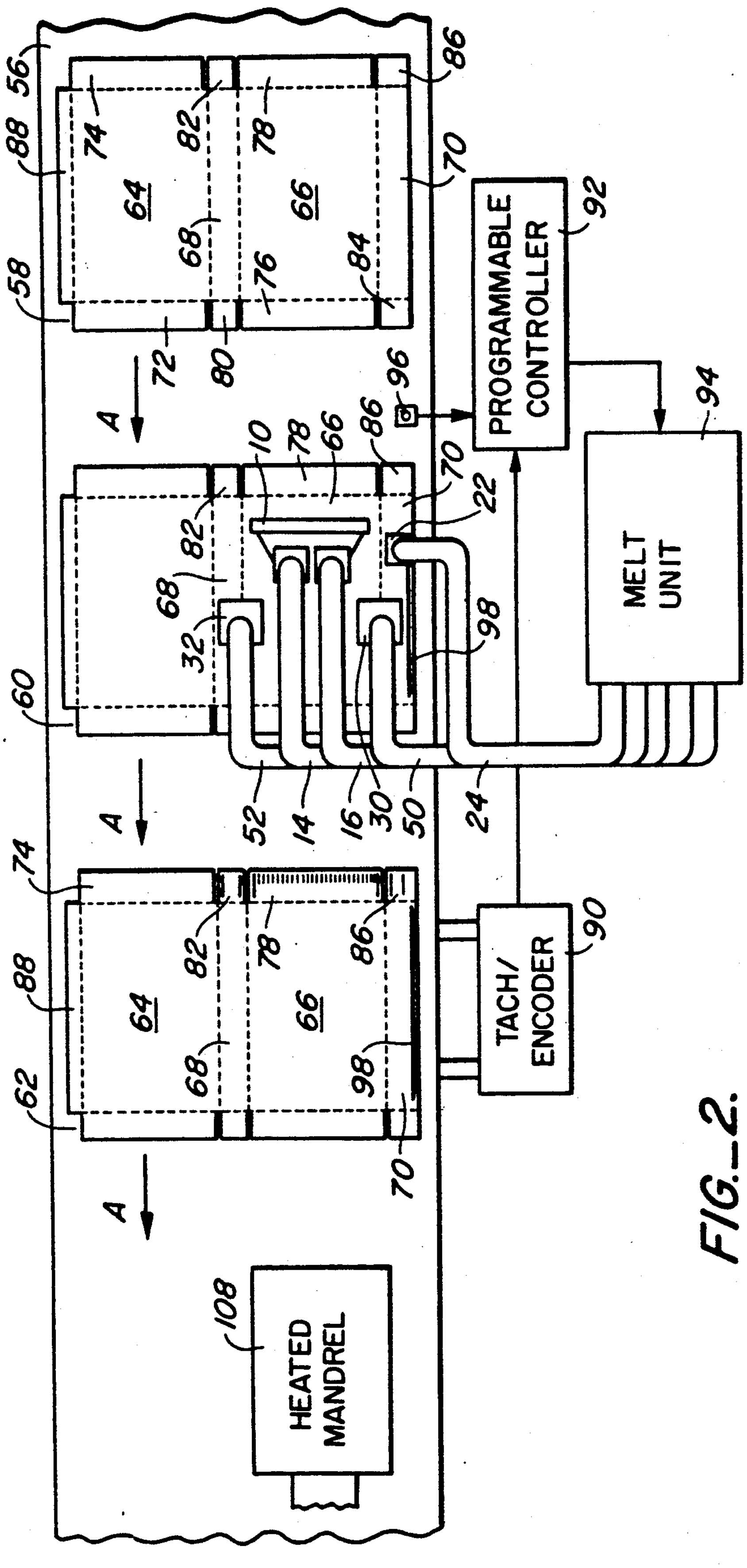
FIG. 2 is a top view of an adhesive application system which includes the applicator head configuration of FIG. 1.

Referring now to FIG. 2, an assembly line 56 is shown for moving cardboard cartons 58, 60 and 62 in the direction shown by arrows A. With focus on the cardboard carton 58, each carton includes front and back major surfaces 64 and 66 and includes minor sides 68 and 70. The front major surface 64 has a leading and a trailing major flap 72 and 74, as defined by the direction of carton travel on the assembly line. Likewise, the back major surface 66 has leading and trailing major flaps 76 and 78. The sides 68 and 70 include minor flaps 80, 82, 84 and 86. Finally, an attachment flap 88 extends from the front major surface 64 opposite the side 68.

The dashed lines of the cardboard cartons 58, 60 and 62 indicate fold lines for assembly of a container.

The assembly line 56 includes a tachometer-encoder 90 for determining the rate of speed of the assembly line. A programmable controller 92 is connected to an adhesive melt unit 94 to control extrusion of hot-melt adhesive from the applicator heads 10, 22, 30 and 32. The controller 92 is programmed to selectively actuate the solenoids of the applicator heads. As will be explained more fully below, the extrusion of adhesive from the various applicator heads is a series of timed events to provide adhesive stripes of measured distances. The assembly line 56 is capable of operating at various speeds. Thus, the tachometer-encoder 90 is included to determine the speed in the assembly line and to update the controller 92 to make the necessary adjustments. A photoeye 96 above the assembly line 56 senses feed of a cardboard carton 58, 60 and 62, so as to trigger the controller 92 for application of adhesive to the carton.

The center cardboard carton 60 is in a position in which the photoeye 96 has triggered the programmable controller 92. The single-nozzle applicator head 22 is shown extruding a bead of adhesive 98 along the outside edge of the minor side 70. The remaining three heads 10, 30 and 32 are in an inactive condition, but are positioned to extrude adhesive on the trailing flaps 78, 82 and 86 of the back major surface 66 and the minor sides 68 and 70.

Figure 3:
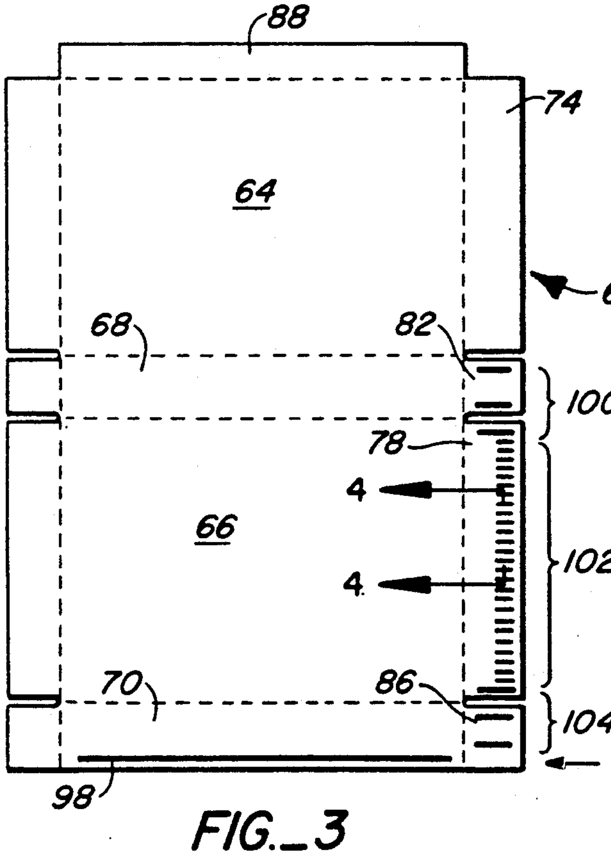
FIG. 3 is a top view of a carton of FIG. 2.

Referring now to FIGS. 2 and 3, the cardboard carton 62 is shown as having a first set 100, a second set 102 and a third set 104 of parallel lines of adhesive. The first set of adhesive lines 100 is applied by applicator head 32 and includes a pair of lines on the trailing minor flap 82 and a single line on the trailing major flap 78. In like manner, the T-bar applicator head 30 extrudes adhesive for two adhesive lines on the trailing minor flap 86 and a single line on the trailing major flap 78. As previously noted, the single-nozzle applicator head 22 applies the bead of adhesive 98.

Figure 4:
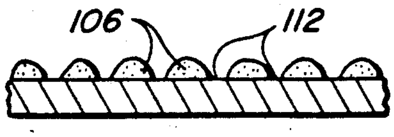
FIG. 4 is a rear view of the carton of FIG. 3 taken along lines 4—4.

The fine-line applicator head 10 applies the second set of lines of adhesive 102. The set is a series of extrusions, spaced apart by a distance corresponding to the spacing of the nozzles of the applicator head 10. Preferably, the spacing of line centers is approximately 0.125 inch, but can vary between 0.0625 inch and 0.375 inch. The second set of lines of adhesive 102 is a fine-line application of hot-melt adhesive, with the lines being equal in length. The preferred length is a range of 0.1 inch and 0.6 inch. A portion of the second set 102 is shown in section in FIG. 4. Each line 106 is spaced apart from the adjacent adhesive lines by a gap 112 less than the width of the adhesive line. While some merging of adhesive lines 106 may occur, at least initially it is preferred that no merging of lines takes place.

Where a product-containing liner is used in conjunction with the cardboard carton 62, a heated mandrel 108 is employed to form the liner. The configuration of the heated mandrel 108 is not critical. Here, the heated mandrel has a volume corresponding to the volume defined by folding of the carton 62. The lower side of the mandrel is placed in contact with the back major surface 66 of the carton. The front major surface 64 is then folded above the mandrel to contact the upper surface of the mandrel. The attachment flap 88 is folded, whereafter the minor side 70 is brought into contact with the side of the mandrel so that the bead of adhesive 98 is compressed against the attachment flap 88 to adhere the carton 62 into a cylindrical configuration.

Figure 4A:
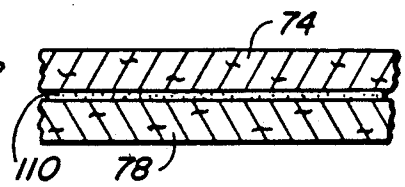
FIG. 4A is a sectional view of the carton of FIG. 3 in a folded condition.

To enclose the bottom of the carton 62, the trailing major flap 74 of the front major surface 64 is folded to contact the heated mandrel 108. The opposed trailing minor flaps 82 and 86 are tucked inwardly to adhere the minor flaps to the major flap 74. The trailing major flap 78 of the back major surface 66 is then folded to contact the minor flaps 82 and 86 and the other trailing major flap 74. Contact of the pair of trailing major flaps 74 and 78 is best seen in FIG. 4A. The major flaps are pressed together to compress the adhesive so as to form a continuous strip of adhesive 110 therebetween. The continuous strip of adhesive has a height which is somewhat exaggerated in FIG. 4A for purposes of illustration. In actuality, the adhesive is a very thin layer. Thus, there is a relatively great amount of area of adhesive-to-flap contact per volume of adhesive used. Since the adhesive-to-flap contact determines the bond strength, the present method of forming a sift-proof seal significantly reduces the amount of adhesive needed to achieve a desired bond strength.

Moreover, the trailing end of the carton 62 is sealed to prevent sifting of the contents of the carton without movement of applicator heads relative to an assembly line. Referring now to FIGS. 1 and 3, the applicator heads 10, 22, 30 and 32 form seals which extend along paths that are parallel to and perpendicular to carton travel, but the heads remain stationary. It is the carton itself which doctors the application of adhesive to form a continuous strip of adhesive along the trailing edge of the major flap 78. The adhesive is applied in an airborne manner to prevent premature plugging and contamination of the nozzles 12, 26 and 34-44.

While the present invention has been described and illustrated as providing a sift-proof seal for cardboard cartons, the present method is utilized to achieve such seals for other containers. Moreover, the cardboard carton 62 may be a linerless carton since the four applicator heads 10, 22, 30 and 32 combine to form sift-proof seals about the entirety of the carton, with the exception of the lead end of the carton. After insertion of the product into the carton, the lead end can be sealed using an applicator head configuration substantially identical to that of FIG. 1, with the exception of elimination of the single-nozzle applicator head 22.

Another adaptation is to use the applicator head configuration head of FIG. 1 with double packaging machinery. "Double packaging" is defined as the simultaneous extrusion of both that adhesive needed for sealing a carton and that adhesive needed for adhering a carton liner to the carton. For example, in FIG. 2, an additional applicator head could be provided to apply one or more beads of adhesive along the center of the back major surface 66 for adhering the liner to the carton.

We claim:

1. A method of forming a sift-proof seal for a container having flaps comprising,
   moving said container relative to a plurality of closely spaced outlets for extruding adhesive,
   extruding adhesive from said nozzles to form a plurality of closely spaced parallel lines of adhesive on a portion of a first flap of said container, said lines of adhesive having gaps therebetween and having lengths generally parallel to said relative movement of said container, the sum of the areas of said gaps between said lines of adhesive being less than that area of said first flap covered by said lines of adhesive, and
   compressing said lines of adhesive between said first flap and a second flap, said lines of adhesive being spaced apart such that said compressing causes merging of adjacent lines of adhesive.

2. The method of claim 1 wherein said step of moving said container is performed while said outlets are fixed in position.

3. The method of claim 1 wherein said step of extruding adhesive is performed with said outlets being spaced apart from each other by a distance in the range of 0.0625 inch to 0.25 inch.

4. The method of claim 1 wherein said adhesive is extruded at a low pressure.

5. The method of claim 4 wherein said pressure is in a range of 200 psi and 500 psi.

6. The method of claim 1 wherein said extruding of adhesive forms a pattern of lines on said first flap proximate to a first edge thereof, said pattern having a width along the major portion of said first edge and having a length in the range of 0.1 inch to 0.75 inch.

7. The method of claim 6 wherein said edge extends perpendicular to said relative movement between said container and said outlets and wherein said extruding of adhesive includes forming a line of adhesive proximate to a major portion of each edge perpendicular to said first edge.

8. A method of forming a sift-proof seal for a container having a plurality of flaps comprising,
   moving said container in a direction toward a stationary array of adhesive outlets, said adhesive outlets aligned to extrude a plurality of adhesive lines parallel to said direction of movement,
   forming a plurality of closely spaced parallel lines of adhesive on a seal surface of said container by extruding material from said stationary array of adhesive outlets, said lines of adhesive defining gaps between said lines, the width of lines of adhesive being greater than the width of said gaps,
   forming lines of adhesive on first and second minor flaps of said container by extruding material from said stationary array of adhesive outlets, said lines of adhesive on said minor flaps extending parallel to said lines of adhesive on said seal surface, and
   folding flaps of said container to bring said first major flap into contact with said seal surface and to pivot said minor flaps into sealing engagement with one of said first major flap and said seal surface, said folding of said minor flaps being in a manner to position said lines of adhesive on said minor flaps perpendicular to said lines of adhesive formed on said seal surface, said folding causing compressing of said adhesive on said seal surface to merge said closely spaced lines, thereby forming a substantially continuous strip of adhesive along said seal surface of said container, said strip of adhesive being adjacent an edge of said first major flap.

9. The method of claim 8 wherein said seal surface is a second major flap and wherein said step of folding said flaps includes folding said second major flap into contact with said first major flap.

10. The method of claim 9 wherein said movement of said container defines a leading and a trailing edge of said second major flap, said pattern of lines of adhesive being formed proximate to one of said leading and trailing edges, said method further comprising forming a line of adhesive along each of opposed edges of said second major flap perpendicular to said leading and trailing edges.

11. The method of claim 8 wherein said lines of adhesive on said seal surface is formed by extruding adhesive from nozzle outlets spaced apart by a distance in the range of 0.0625 inch to 0.25 inch, said lines having a length in the range of 0.1 inch to 0.6 inch.

12. The method of claim 11 wherein said nozzles are spaced apart from said container.

13. The method of claim 8 wherein said lines of adhesive are formed using low pressure extrusion.

14. A method of forming a sift-proof seal for a container having a plurality of flaps which are brought into contact with each other when folded toward the center of said container, said method comprising, moving said container relative to a plurality of airborne streams of adhesive, said streams being in closely spaced relation to form a plurality of first adhesive lines on a first flap of said container, with said first adhesive lines being perpendicular to a first edge of said first flap, said first adhesive lines formed in a direction generally parallel to said relative movement, forming a second adhesive line proximate to each of opposed second and third edges of said first flap, said second adhesive lines being generally perpendicular to said first edge, forming a third adhesive lines on each of minor flaps disposed adjacent to said second and third edges, said third adhesive lines extending parallel to said first and second adhesive lines, and folding said first flap, said minor flaps, and a second flap toward the center of said container to compress said adhesive lines between said flaps, said compressing being of sufficient force to cause adjacent adhesive lines of said first adhesive lines to flow together so as to form a continuous strip of adhesive.

15. The method of claim 14 wherein said container is moved and the direction of movement defines a leading edge and a trailing edge of said first flap, said first adhesive lines being at one of said leading and trailing edges.

16. The method of claim 15 wherein said first adhesive lines have a length in the range of 0.1 inch to 0.6 inch.

17. The method of claim 14 wherein said streams of adhesive are extruded from a plurality of nozzles.

18. The method of claim 14 wherein said streams are spaced apart by a distance in a range of 0.0625 inch to 0.375 inch.

19. The method of claim 14 further comprising forming a fourth adhesive line along a first side of said container prior to said step of folding, said fourth adhesive line formed to adhere said first side to a second side of said container upon folding of said container and said step of folding said flaps.

* * * * *